United States Patent Office 2,796,694
Patented June 25, 1957

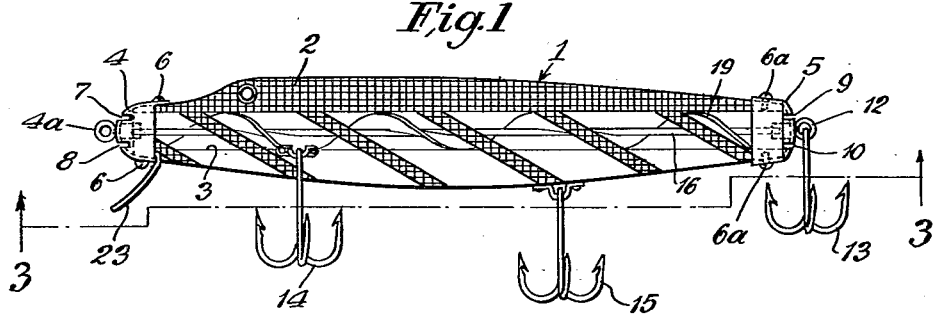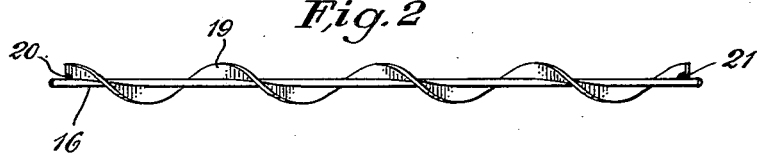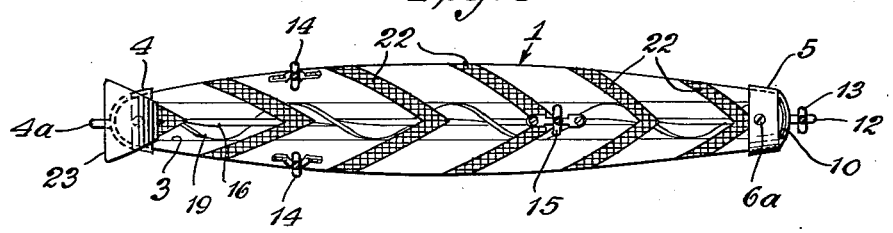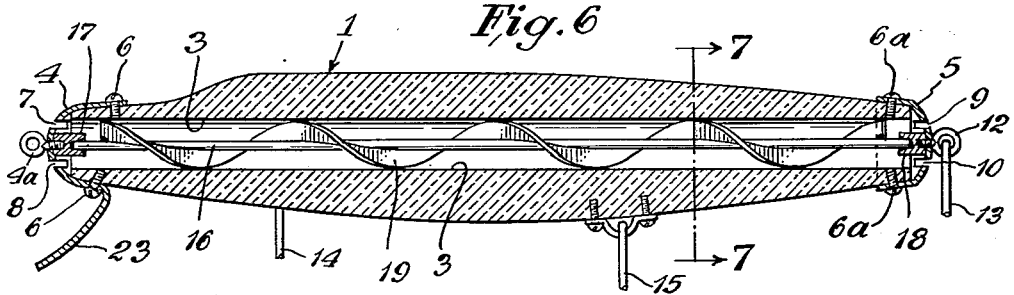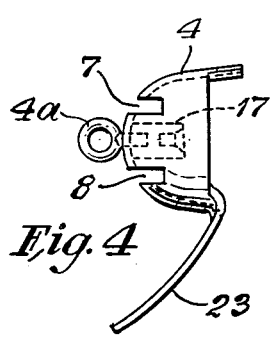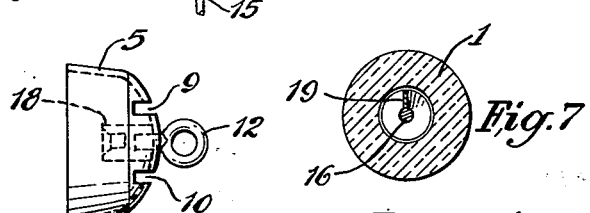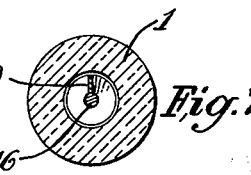

2,796,694

ARTIFICIAL FISHING LURE

Fred Turner, Ypsilanti, Mich.

Application January 7, 1955, Serial No. 480,491

6 Claims. (Cl. 43—42.12)

The present invention is directed to a new and improved form of fishing lure. The invention has for its main object the provision of a new and improved artificial fishing lure which presents a distinct pattern of motion when it is drawn through the water.

Another purpose of the present invention is the provision of a new and improved fishing lure which is easily formed and assembled.

Other objects will appear from a reading of the specification and claims which follow.

The invention is illustrated more or less diagrammatically in the accompanying drawings, wherein:

Figure 1 is a side elevation of the present invention;

Figure 2 is a detail view showing certain elements utilized in the artificial lure shown in Figure 1;

Figure 3 is a sectional bottom view of the artificial lure taken on line 3—3 of Figure 1;

Figure 4 is an enlarged detailed view of one of the elements shown in Figure 1;

Figure 5 is an enlarged detailed view of another element illustrated in Figure 1;

Figure 6 is an enlarged central longitudinal section of the fishing lure shown in Figure 1; and Figure 7 is a transverse section taken on line 7—7 of Figure 6.

Like elements are designated by like characters throughout the specification.

Referring specifically now to the drawings and in the first instance to Figure 1, I illustrate a generally elongated body 1 which is preferably formed from a transparent plastic. The body may be molded in any well known manner. The body 1 may take the shape of a minnow as I have illustrated in Figure 1, although I do not wish to be limited to this particular shape. It is important, however, that the body be generally elongated and have the ability to transmit light for reasons which will appear. The upper portion of the body may be opaque as at 2. The opacity may be provided by enameling the upper portion of the body with black lacquer in the manner illustrated.

Extending from the front end of the body to the rear end thereof is an elongated bore 3 which is seen most clearly in Figure 6. This bore may be drilled in the body 1 or formed in the molding process. The bore 3 extends generally parallel to the longitudinal axis of the body and it is preferably centrally disposed. End caps 4 and 5 are positioned at each end of the body so as to partially close the bore 3. The end caps 4 and 5 may be fabricated from metal. They may have a general cup shape as illustrated particularly in Figures 4 and 5 so as to slip over and snugly receive the opposite ends of the body 1. The end caps 4 and 5 may be fastened to the body by any suitable means such as screws or the like, 6 and 6a. In Figure 4 it will be noted that the end cap 4 has apertures 7 and 8 therein which are formed as slots in the wall of the end cap. The rear end cap 5 has similar apertures in the form of slots 9 and 10 formed therein. The apertures 7, 8, 9, and 10 are formed so as to open into the bore 3 and to allow the passage of water into the bore 3 when the body 1 is submerged. The front end cap 4 may have a ring eyelet 4a for attaching a leader or fishing line thereto. The rear end cap 5 may be provided with a similar eyelet or ring 12 so as to provide a support for a hook 13. Similar hooks 14 and 15 may be spaced along the body 1 along the lower portion thereof and attached to the body by any suitable conventional fastening means such as screws or the like.

An elongated shaft 16 is positioned in the bore 3 and is supported at its opposite end in bearings 17 and 18 positioned between the apertures 7, 8, 9 and 10 and carried by the respective end caps. A strip of twisted metal or the like 19 is wound spirally about the shaft 16 and fastened to the opposite ends of the shaft as at 20 and 21. It may be welded or otherwise secured to the shaft 16.

The lower portion of the body 1 is divided into alternate, diagonally extending, transparent and opaque areas. These areas may be formed by enameling the exterior surface of the body with black lacquer or the like to present spaced, rearwardly converging stripes 22. In the embodiment illustrated, the stripes 22 commence on opposite sides of the body at approximately the center of the body and converge together at the lowermost portion of the body. The stripes merge with the upper portion 2 and have a smaller overall area than the intermediate transparent areas.

The spirals 19 may be colored with any one or several of the spectral colors of the rainbow so as to present a brilliant color effect to the moving spiral.

A depending and forwardly inclined plate-like member 23 may be formed integrally with the cap 4 to provide a means for regulating the depth of the lure.

The overall arrangement is such that the moving spiral is visible at either side of the artificial lure or at the bottom thereof and when the lure is given the opaque and transparent coloration I have indicated, the effect, when the body is submerged and drawn through the water by the fishing line, is that of a plurality of areas of brilliant colors undergoing motion of a snake-like character.

The spiral may be twisted in such a way that the force of the water passing through the bore 3 will cause the rotation of the spiral 19 in a manner giving the illusion of motion of the spiral with respect to the body 1 along the longitudinal axis of the body. This has the effect of creating an illusion of greater speed of those areas of the spiral visible through the transparent portions of the body than the speed at which the body is actually being drawn through the water by the fishing line.

Whereas I have shown and described an operative form of my invention, I wish it to be understood that this showing should be taken in an illustrative or diagrammatic sense only. There are many modifications to my invention which will be apparent to those skilled in the art and which will fall within the scope and spirit of the invention. The scope of the invention should, therefore, be limited only by the scope of the hereinafter appended claims.

I claim:

1. An artificial fishing lure comprising a generally elongated body, said body having an elongated generally cylindrical bore disposed generally parallel to the longitudinal axis thereof and centrally thereof, said bore, when submerged, being visible through a transparent portion of said body, an elongated spiral strip rotatably mounted in said bore, and means for allowing passage of water through said bore when said body is submerged in water to thereby rotate said strip as said body is propelled through the water.

2. An artificial fishing lure comprising a generally elongated plastic body, said body having a generally opaque upper portion and a lower portion divided into alternate diagonally extending transparent and opaque areas, an elongated bore passing from end to end of said body, end caps at the respective ends of said bore, and an elongated spiral strip of metal positioned in said bore and rotatably mounted at opposite ends thereof in said end caps, each of said end caps having apertures therein to allow passage of water therethrough to thereby cause rotation of said strip during movement of said body through said water, and a plurality of hooks positioned along said body.

3. The structure of claim 2 wherein each of said apertures are formed as slots in said end caps.

4. The structure of claim 2 wherein said diagonal areas are rearwardly converging and meet along the approximate center line of said body at the lower portion of said body.

5. The structure of claim 2 wherein said strip is rainbow colored and is wound about a shaft journaled in said end caps.

6. An artificial fishing lure including a generally elongated plastic body, said body having a generally opaque upper portion extending from end to end of said body and a lower portion divided into alternate diagonally extending transparent and opaque areas, and an elongated bore extending from one end of the body to the other at a level generally below said upper portion, said bore having a brilliantly colored spiral member rotatably mounted therein, said member being visible through said transparent areas at the sides and at the lower portion of said body.

References Cited in the file of this patent

UNITED STATES PATENTS

| | | |
|---|---|---|
| 1,101,655 | Ness | June 30, 1914 |
| 1,470,842 | Hyams | Oct. 16, 1923 |
| 1,737,683 | Readman | Dec. 3, 1929 |
| 1,772,058 | Welch | Aug. 5, 1930 |
| 2,517,620 | Anderson | Aug. 8, 1950 |
| 2,560,733 | Morris | July 17, 1951 |
| 2,627,134 | Fitzgerald | Feb. 3, 1953 |
| 2,629,960 | Baxter | Mar. 3, 1953 |

FOREIGN PATENTS

| | | |
|---|---|---|
| 119,475 | Australia | Jan. 17, 1945 |